Oct. 31, 1939. T. E. WAENERLUND Re. 21,251
METHOD OF MANUFACTURING CELLULOSE ACCORDING TO THE SULPHITE METHOD
Original Filed Sept. 8, 1930
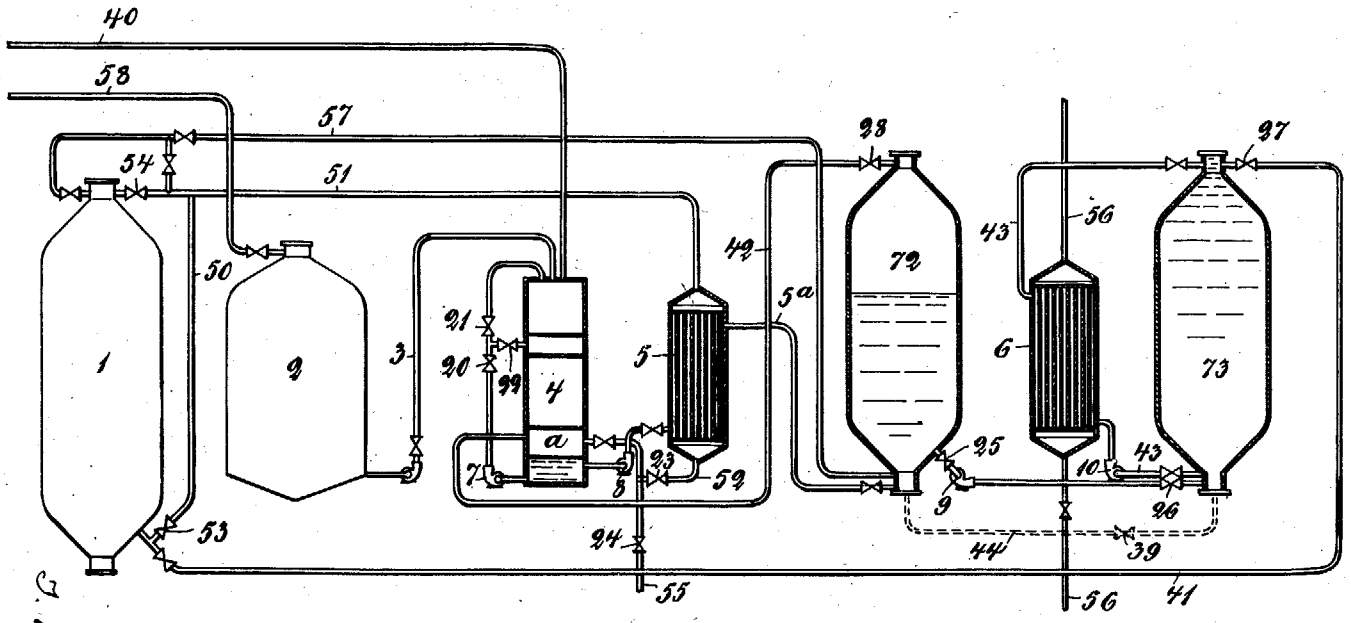
T. E. Waenerlund
INVENTOR
By: Marks & Clerk
ATTYS.

Reissued Oct. 31, 1939

Re. 21,251

UNITED STATES PATENT OFFICE 21,251

METHOD OF MANUFACTURING CELLULOSE ACCORDING TO THE SULPHITE METHOD

Torsten E. Waenerlund, Domsjo, Ornskoldsvik, Sweden, assignor to Mo och Domsjö Aktiebolag, Ornskoldsvik, Sweden Original No. 1,809,499, dated June 9, 1931, Serial No. 480,530, September 8, 1930. Application for reissue April 4, 1939, Serial No. 266,031. In Sweden February 20, 1929

4 Claims. (Cl. 92—11)

The present invention refers to a method of cooking sulphite-cellulose which has for its object to utilize the heat of the waste gases and the waste lye from the digester or boiler for manufacturing a sulphite liquor (cooking acid) with a very high percentage of $SO_2$. The characteristic feature of the invention consists in this that the raw sulphite liquor or "raw acid," which as known contains calcium bisulphite and free $SO_2$ as it comes from the acid towers and before being introduced into the digester is caused to pass through an absorption tower where it is enriched with $SO_2$ coming partly from the waste gases escaping from the boiler and partly from heated acid, whereafter the raw acid, after having been enriched with $SO_2$ in this manner, is caused to pass through a preheater being heated by means of waste gases and waste lye from the digester. The raw acid having been treated in such a manner is then introduced into a storage receptacle from which the same, after having been further heated, if necessary, may be directly carried over to the digester, or even it is first introduced into a second receptacle which is maintained filled with acid, the acid in said receptacle being held in continuous circulation through a preheater, so that it is heated to the required temperature suitably 100–120° C., before being introduced into the digester.

A form of embodiment of the method is described in the following specification, reference being had to the accompanying drawing, where an apparatus system for the execution of the method is schematically shown. This apparatus system also forms part of the invention.

Through the conduit 58 raw acid is supplied from the acid towers (not shown) to the receptacle 2 from which said acid is through the conduit 3 pumped over to the top of the absorption tower 4 which for effecting a good absorption is filled with acid-proof material, for instance so-called spiral bodies. To the lower end of the absorption tower are connected two pumps 7 and 8, one 7 of which causes a quantity of acid controlled by the valve 20 to circulate either through the whole tower or through a certain part of the lower end of the same, which may be regulated by the valves 21 and 22. The other pump 8 has its suction tube situated on a higher level than the suction tube of the pump 7 and forces the acid through the preheater 5 and from there through the conduit 5a to the receptacle 72. The preheater 5 is provided with a heating element consisting of tubes. Through the same is forced through the conduits 50 and 51 as a heating medium partly lye taken out from the digester during the cooking operation, partly gases escaping from the digester during the cooking operation and partly hot waste lye which is taken out from the digester after finished cooking. These gases and liquids give off one part of their heat to the cooking acid. In order to obtain a higher temperature difference in the preheater between the heating medium and the cooking acid the currents of lye and gases are regulated by means of the valve 23 in the conduit 52 between the preheater and the absorption tower 4, the valves 53—54 located before the preheater being then fully opened. By this means the heat delivering medium will have the same temperature as the content of the digester when it passes through the preheater.

From the preheater 5 cooled lye and waste gases are led through the conduit 52 to the lower part of the absorption tower 4, whereafter in this tower the $SO_2$ gas is absorbed by the raw acid circulating through said tower. The upper part of the absorption tower is through the conduit 40 connected with the acid tower, so that $SO_2$ gases which may not have been absorbed in the absorption tower are recovered and utilized in the acid tower.

Those parts of the waste lye and of the condensate from the gases, which are not to be mixed with the raw acid are removed from the conduit 52 through the valve 24 and conduit 55.

The acid which has been enriched with free $SO_2$ in the absorption tower 4 is pumped in the previously indicated manner through the preheater 5 to the receptacle 72 into which it enters preheated to a temperature of about 50–60° C. In order to avoid the formation of a vacuum and of too high a pressure at varying liquid levels in the receptacle 72 the gas chamber of the latter is by means of an automatically acting valve 28 and the conduit 42 connected with the gas chamber *a* of the absorption tower, so that the acid receptacle 72 is through the absorption tower put into connection with the gas conduit 40 of the acid tower. Through the conduit 57 the waste gases from the digester may be introduced into the acid in the lower part of the receptacle 72.

From the receptacle 72 the acid may be carried over to the receptacle 73 which latter is continuously filled with cooking acid heated to about 100–120° C. The carrying over of the acid from receptacle 72 to receptacle 73 is executed in connection with the filling of the digester with acid. Then the valves 25, 26 and 27 are opened so that the acid is forced by means of the pump 9 from the receptacle 72 to the bottom of the receptacle 73, where it forces out hot acid from the latter, which hot acid through the valve 27 and the conduit 41 is brought over from the top of the receptacle 73 and into the digester. The pumping continues until the digester is filled with acid, whereafter the pump is stopped and the last mentioned valves are closed. The receptacle 73 is then still filled with acid which is colder in the lower part of the same than in the upper part.

The heating of the cooking acid in the receptacle 73 takes place indirectly by means of steam from the conduit 56 in the preheater 6 through which acid is held in circulation through the conduit 43 and the pump 10. A dangerous pressure which may be created during the heating operation is balanced by means of any suitable arrangement, for instance a conduit 44 between the bottoms of both the receptacles and a valve 39 in said conduit.

It is evident that several variations of the process are possible without departing from the scope of the invention. Thus for instance it will be possible to use instead of the absorption tower 4 several such towers of inferior height each such tower of low height working in the same manner as above described in connection with the absorption tower 4. Moreover, it is not necessary to use the receptacle 73 in which case only the receptacle 72 is used and is then connected with the preheater 6 in the same manner as shown in the drawing in connection with the receptacle 73 so that the acid will be sufficiently heated before being introduced into the digester. However, from several points of view it may be advantageous to use two receptacles 72 and 73, as the counter pressures will be more favourable and, moreover, a purer acid may be taken out from the receptacle 73 if the latter cooperates with the receptacle 72 than would be the case if acid was taken out directly from the latter. If necessary the acid may be further heated between the receptacles 72 and 73.

Besides the advantages in respect of heat economy and with regard to the possibility of obtaining an acid containing a high percentage (8% or more) of free $SO_2$ the invention offers the following advantages:

The removing of the gases from the digester may take place in a more quick and complete manner due to the fact that the counter pressure may be regulated as far as down to the atmospheric pressure. Previously the waste gases have as a rule after cooling been introduced directly into the acid receptacles in which case partly the absorption has been very bad and partly the removing of the gases from the boiler has been very slow due to an increasing counterpressure.

Due to the fact that the finished cooking acid is taken out from the top of the receptacle 73 the same may be freed from sludge and other impurities being injurious for the cooking operation. This is rendered possible in such a manner that the circulation pump 10 is stopped some minutes before the digester is to be supplied with acid in order that sludge and other heavy impurities may sink to the bottom from which they may be removed from time to time.

I claim:

1. Method of manufacturing cellulose by cooking cellulosic material in a digester with a cooking acid of high percentage of free $SO_2$, comprising causing the cold raw acid, before introducing the same into the digester, to pass through an absorption apparatus, enriching the same in said apparatus with $SO_2$ at atmospheric pressure, passing the acid thus enriched through a heat transmission apparatus, introducing into said apparatus as heating medium warm waste products from the digester and leading said heating medium, after it has given off heat to the acid, into the absorption apparatus, forcing the acid thus enriched and heated into a storage receptacle, heating the same and introducing it into the digester for cooking cellulosic material therewith under pressure.

2. Method of manufacturing cellulose by cooking cellulosic material in a digester with a cooking acid of high percentage of free $SO_2$, comprising causing the cold raw acid, before introducing the same into the digester, to pass through an absorption apparatus, circulating said acid through said apparatus so as to enrich the same with $SO_2$ at atmospheric pressure, forcing the acid thus enriched through a heat transmission apparatus, leading through said apparatus as heating medium hot waste gases and waste lye from the digester and introducing such gases and lye, after having given off heat to the acid, into the absorption apparatus, forcing the acid thus enriched and heated into the lower part of a storage receptacle, forcing such acid therefrom into the lower part of another storage receptacle, circulating the acid in said receptacle through a heating element, leading off acid from the top portion of said receptacle and into the digester, and cooking cellulosic material therewith in said digester.

3. Apparatus system for making acid sulphite liquor with high percentage of free $SO_2$, comprising in combination an absorption apparatus, a heat transmitting apparatus and a storage tank, means for introducing raw acid from the acid tower into said absorption apparatus, means for circulating the acid within said apparatus, means for leading through said heat transmitting apparatus waste gases and lye from the digester and means for introducing the same into the absorption apparatus, means for forcing the enriched and heated acid from the absorption apparatus through the heat exchange apparatus and therefrom to a storage tank, and means for further heating the acid and for forcing it into the digester.

4. In an apparatus system according to claim 3, the combination with the receptacle receiving heated and enriched acid from the heat exchange apparatus of a second receptacle for acid, means for carrying over acid from said first receptacle to the second receptacle, means for circulating the acid in the second receptacle through a heating element, and means for forcing the acid from the top of the second receptacle into the boiler.

TORSTEN E. WAENERLUND.